US009523602B2

(12) United States Patent
Otoshi et al.

(10) Patent No.: US 9,523,602 B2
(45) Date of Patent: Dec. 20, 2016

(54) VIBRATING CONICAL DISTRIBUTING TABLE FOR A COMBINATION WEIGHING APPARATUS WITH ROTARY STIRRING ARMS HAVING DOWNWARDLY EXTENDING STIRRING PLATES

(71) Applicant: Ishida Co., Ltd., Kyoto (JP)

(72) Inventors: Hiroki Otoshi, Ritto (JP); Hideshi Miyamoto, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 97 days.

(21) Appl. No.: 14/656,126

(22) Filed: Mar. 12, 2015

(65) Prior Publication Data

US 2016/0209263 A1   Jul. 21, 2016

(30) Foreign Application Priority Data

Jan. 20, 2015   (JP) ................................ 2015-008736

(51) Int. Cl.
| | | |
|---|---|---|
| G01G 13/02 | (2006.01) |
| G01G 19/387 | (2006.01) |
| B65G 47/12 | (2006.01) |
| B65G 47/19 | (2006.01) |
| G01G 19/393 | (2006.01) |
| G01G 13/00 | (2006.01) |
| B65G 47/14 | (2006.01) |

(52) U.S. Cl.
CPC .......... *G01G 19/393* (2013.01); *G01G 13/003* (2013.01); *G01G 19/387* (2013.01); *B65G 47/12* (2013.01); *B65G 47/1421* (2013.01); *B65G 47/19* (2013.01)

(58) Field of Classification Search
CPC ............ G01G 13/022–13/026; G01G 19/387; G01G 19/393; B65G 47/12; B65G 47/1414–47/1421; B65G 47/16; B65G 47/19
See application file for complete search history.

(56) References Cited

U.S. PATENT DOCUMENTS

| | | | | |
|---|---|---|---|---|
| 4,569,405 A | * | 2/1986 | Oshima ................ | G01G 19/393 177/25.18 |
| 4,570,831 A | * | 2/1986 | Izumi ................... | G01G 19/393 198/756 |

(Continued)

FOREIGN PATENT DOCUMENTS

| | | |
|---|---|---|
| JP | S64-8638 U | 1/1989 |
| JP | 2538633 Y2 | 6/1997 |

(Continued)

*Primary Examiner* — Randy W Gibson
(74) *Attorney, Agent, or Firm* — Studebaker & Brackett PC (57) ABSTRACT

A combination weighing apparatus comprises a distributing table having a conical vibrating surface, a cap disposed above an apex portion of the distributing table, a plurality of supply troughs arranged radially around the distributing table with a downward gap S interposed therebetween, and a rotary stirrer for stirring articles supplied from the distributing table to the plurality of supply troughs. The rotary stirrer includes a stirring arm extending from the apex portion of the distributing table along the vibrating surface and a leading end stirring plate disposed on the leading end side of the stirring arm. The leading end stirring plate is arranged in the gap.

7 Claims, 8 Drawing Sheets

(56) References Cited

U.S. PATENT DOCUMENTS

| | | | | |
|---|---|---|---|---|
| 4,662,508 A | * | 5/1987 | Inoue | G01G 19/393 |
| | | | | 177/25.18 |
| 4,941,565 A | * | 7/1990 | Hirota | G01G 19/393 |
| | | | | 177/25.18 |
| 6,689,961 B2 | | 2/2004 | Matsuyama et al. | |

FOREIGN PATENT DOCUMENTS

| | | |
|---|---|---|
| JP | 2577716 Y2 | 7/1998 |
| JP | 2002-296098 A | 10/2002 |
| JP | 3718727 B2 | 11/2005 |
| JP | 2010-112897 A | 5/2010 |

* cited by examiner

VIBRATING CONICAL DISTRIBUTING TABLE FOR A COMBINATION WEIGHING APPARATUS WITH ROTARY STIRRING ARMS HAVING DOWNWARDLY EXTENDING STIRRING PLATES

BACKGROUND OF THE INVENTION

Field of the Invention

The present invention relates to a combination weighing apparatus.

Related Background Art

A Combination weighing apparatus has widely been known as automatic weighing apparatus which weighs out a fixed weight of articles, such as agricultural products, marine products, and processed foods, whose unit weights vary. A basic structure of such an apparatus comprises a plurality of weighing hoppers arranged in a circle and a distributing supply unit for supplying appropriate amounts of the articles to the respective weighing hoppers.

The distributing supply unit comprises a conical distributing part (which may be referred to as "distributing table" or "distributing feeder" depending on literature) and a plurality of supply feeders arranged radially around the distributing part. The distributing part radially distributes the articles supplied from thereabove. The supply feeders transport to their leading end parts the articles delivered from the distributing part, so as to supply them to the weighing hoppers thereunder.

Various auxiliaries are added to the distributing part of the distributing supply unit according to properties of the articles to be dealt with. For sticky articles such as sliced cheese, for example, a flaking unit, a rotary blade, and the like are attached onto the distributing part (see Patent Literature 1 (Japanese Utility Model Application Laid-Open No. S64-8638)). For articles which are easy to adhere, such as chopped ginger and pickles, or articles which are prone to entanglement, such as hijiki (*Sargassum fusiforme*), a rotary flaking rod, an impeller, and the like are attached onto the distributing part (see Patent Literature 2 (Japanese Utility Model No. 2538633) and Patent Literature 3 (Japanese Patent Application Laid-Open No. 2002-296098)). For articles having a very small apparent specific gravity, such as chopped seasoned layer and dried bonito shavings (Hanakatsuo (registered trademark)), a rotary stirrer is hung above the distributing part (see Patent Literature 4 (Japanese Utility Model No. 2577716) and Patent Literature 5 (Japanese Patent No. 3718727)). For cuts of meat such as chicken, a helical member adapted to rotate independently of a rotary distributing part is attached onto the rotary distributing part (see Patent Literature 6 (Japanese Patent Application Laid-Open No. 2010-112897)).

SUMMARY OF THE INVENTION

However, the distributing parts disclosed in Patent Literatures 1 to 3 are fixed and do not vibrate, whereby cut vegetables for salads, for example, loaded on the distributing parts may adhere thereto and fail to be transported well.

By contrast, the distributing parts disclosed in Patent Literatures 4 and 5 are vibrated by electromagnetic feeders and thus do not cause the problem of adherence mentioned above. However, rotators (the part of a conical distributer 6 in particular in Patent Literature 4 and the part of an agitator 10 in Patent Literature 5) are hung from above the distributing parts and consequently impede the articles from being supplied from above the distributing parts. Therefore, the articles are fed laterally to the distributing parts of this type and thus are likely to be distributed unevenly thereon. The articles unevenly distributed on a distributing part are hard to spread all over a plurality of supply feeders arranged around the distributing part even when the articles are tried to be moved circumferentially by the rotators mentioned above.

When a helical member adapted to rotate independently of a rotary distributing part is attached onto the rotary distributing part as in Patent Literature 6, coaxially arranging the rotary axes of the distributing part and helical member makes it possible to place their driving systems under the distributing part, whereby the articles can be supplied from above the distributing part. However, this system cannot be employed for cut vegetables and the like, since rotating the distributing part alone may cause the problem of adherence as in the distributing parts of Patent Literatures 1 to 3.

It is an object of the present invention to overcome such technical problems and provide a combination weighing apparatus suitable for cut vegetables and the like.

The combination weighing apparatus in accordance with one aspect of the present invention comprises a distributing table having a conical vibrating surface, a conical body disposed above an apex portion of the distributing table, a plurality of radial parts arranged radially around the distributing table with a downward gap interposed therebetween, and a rotary stirring unit that stirs articles supplied from the distributing table to the plurality of radial parts; the rotary stirring unit including a stirring arm extending from the apex portion of the distributing table along the vibrating surface and a leading end stirring plate disposed on the leading end side of the stirring arm, the leading end stirring plate being arranged in the gap.

In this combination weighing apparatus, the conical body is disposed above the apex portion of the distributing table, whereby cut vegetables and the like can be supplied from above the apex portion of the distributing table. The cut vegetables and the like supplied to the distributing table are transferred to all over the periphery of the distributing table while being inhibited from adhering to the distributing table by the conical vibrating surface. Since a plurality of radial parts are radially arranged around the distributing table with a downward gap interposed therebetween, the cut vegetables and the like transferred to the periphery of the distributing table are fed to the radial parts while being restrained from stagnating between the periphery of the distributing table and the radial parts. Since the rotary stirring unit includes the leading end stirring plate arranged in the gap between the periphery of the distributing table and the radial parts, the leading end stirring plate rotates along the periphery of the distributing table, thereby securely inhibiting the cut vegetables and the like from stagnating between the periphery of the distributing table and the radial parts. The foregoing enables this combination weighing apparatus to supply cut vegetables and the like, which are articles easy to adhere and hard to be dealt with, all over the radial parts.

In the combination weighing apparatus in accordance with one aspect of the present invention, the leading end stirring plate may be shaped along the gap and a part of the radial parts. This configuration more securely inhibits the cut vegetables and the like from stagnating between the periphery of the distributing table and the radial parts.

In the combination weighing apparatus in accordance with one aspect of the present invention, the stirring arm may be provided with a middle stirring plate having a surface perpendicular to the vibrating surface. This configuration enables the middle stirring plate to rotate along the vibrating surface of the distributing table, thereby securely inhibiting the cut vegetables and the like from adhering to the distributing table and being distributed unevenly over the distributing table.

In the combination weighing apparatus in accordance with one aspect of the present invention, the leading end stirring plate may be formed integrally with the middle stirring plate. This configuration more securely inhibits the cut vegetables and the like from adhering to the middle and leading end stirring plates as compared with a case where middle and leading end stirring plates constructed separately from each other are connected to each other with a joint member, for example.

The combination weighing apparatus in accordance with one aspect of the present invention may further comprise a plurality of vibration sources that impart different kinds of vibration to the distributing table. This configuration can provide the distributing table with such vibration that the cut vegetables and the like are inhibited from adhering to the distributing table and transferred smoothly to the periphery of the distributing table.

The combination weighing apparatus in accordance with one aspect of the present invention may comprise a driving source that rotates the rotary stirring unit normally and reversely. In this configuration, the normally and reversely rotated leading end stirring plate more securely inhibits the cut vegetables and the like from stagnating between the periphery of the distributing table and the radial parts.

The combination weighing apparatus in accordance with one aspect of the present invention may have three stirring arms. In this configuration, three leading end stirring plates efficiently and securely inhibit the cut vegetables and the like from stagnating between the periphery of the distributing table and the radial parts.

DESCRIPTION OF THE PREFERRED EMBODIMENTS

Figure 1:
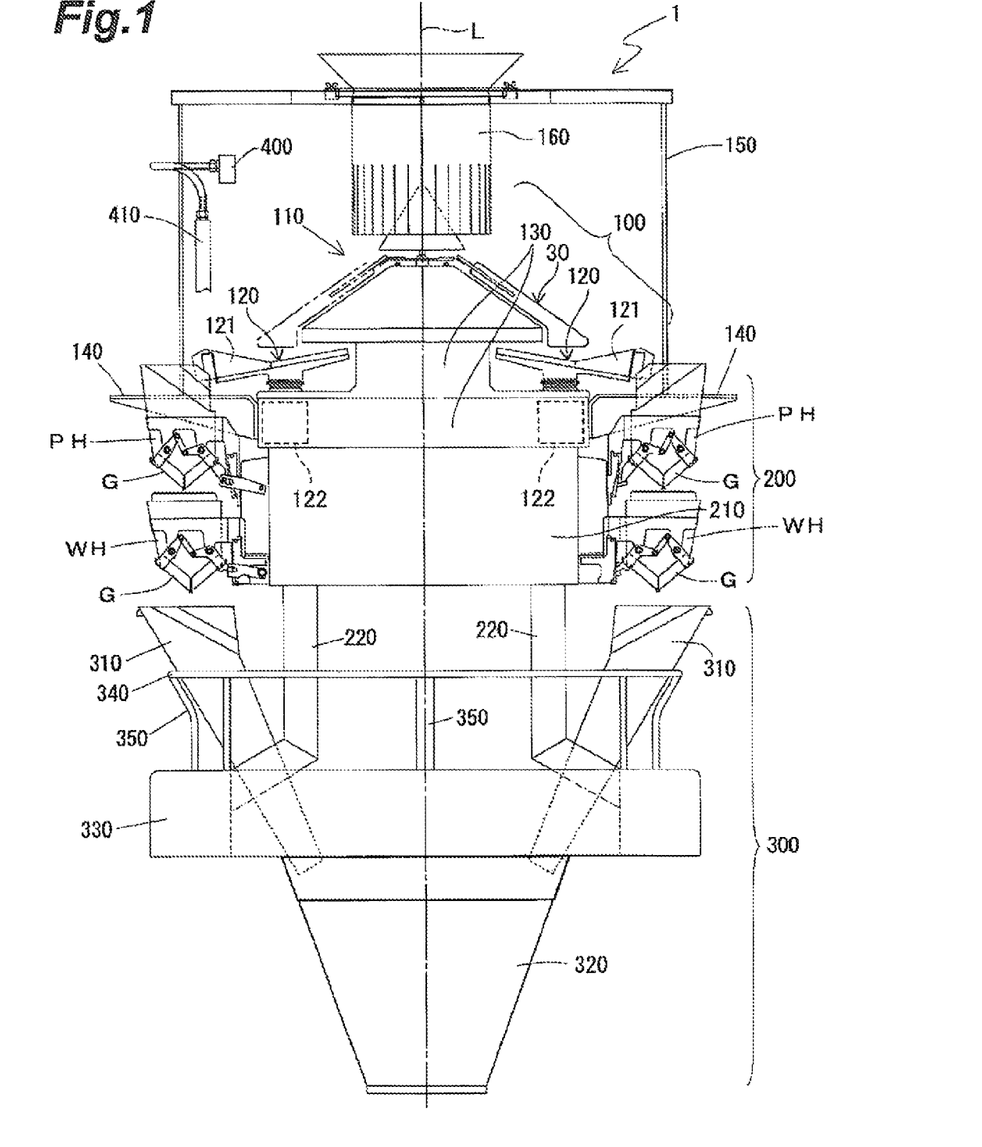
FIG. 1 is a schematic front view of an embodiment of the combination weighing apparatus in accordance with the present invention.

In the following, an embodiment of the present invention will be explained with reference to the drawings.
Structure of Combination Weighing Apparatus FIG. 1 is a schematic front view of an embodiment of the combination weighing apparatus suitable for cut vegetables and the like. As illustrated in this drawing, the combination weighing apparatus 1 comprises a distributing supply unit 100, a combination weighing unit 200, and a collection hopper unit 300. The distributing supply unit 100 distributes articles (cut vegetables and the like) supplied from above into a plurality of radial paths, so as to discharge them downward. The combination weighing unit 200, which is arranged downstream of the distributing supply unit 100, combines the articles discharged from the distributing supply unit 100 while being distributed into a plurality of paths, so as to weigh out a predetermined weight of the articles, and discharges them downward. The collection hopper unit 300, which is arranged downstream of the combination weighing unit 200, assembles the articles discharged from the combination weighing unit 200 into one.

The distributing supply unit 100 comprises a conical distributing part 110 and a plurality of supply feeders 120. The distributing part 110 radially distributes the articles supplied from above. The plurality of supply feeders 120 are arranged radially around the distributing part 110. Each supply feeder 120 individually discharges the articles in small amounts.

The combination weighing unit 200 comprises a plurality of pool hoppers PH, the same number of weighing hoppers WH as the pool hoppers PH, and a main body 210. The pool hoppers PH are arranged under the outlet ends of their corresponding supply feeders 120. The weighing hoppers WH are arranged downstream of their corresponding pool hoppers PH. The main body 210 is surrounded by the plurality of pool hoppers PH and the plurality of weighing hoppers WH and detachably supports each of the hoppers PH, WH. The main body 210 is designed to be waterproof and contains therein driving mechanisms for opening and closing gates G of the hoppers PH, WH, a weight detector on which the weighing hoppers WH are loaded, and the like.

The collection hopper unit 300 comprises a plurality of discrete chutes 310 and a collection chute 320. The plurality of discrete chutes 310 are arranged in a circle so as to correspond to the respective weighing hoppers WH. The collection chute 320 is arranged downstream of the plurality of discrete chutes 310 and formed into two stages of upper and lower funnels.

While a plurality of groups, each comprising the supply feeder 120, pool hopper PH, and weighing hopper WH one by one, are arranged at equally-spaced intervals around a vertical axis L passing through an apex portion of the distributing part 110, FIG. 1 illustrates only a pair of left and right ones opposing each other.

The plurality of supply feeders 120 comprise a plurality of supply troughs (radial parts) 121 and the same number of electromagnetic feeders 122 as the supply troughs 121. Each supply trough 121 is arranged so as to tilt down to the outside. Each electromagnetic feeder 122 imparts vibration to its corresponding supply trough 121. The plurality of electromagnetic feeders 122, an electromagnetic feeder 20 of the distributing part 110 (see FIG. 2), and driving systems such as a drive motor (driving source) 50 for rotating a rotary shaft 40 (see FIG. 2) are contained in waterproof covers 130 constructed in two, i.e., upper and lower, stages. Four brackets 140 are attached to the outer side face of the lower waterproof cover 130. A cubic frame 150 is mounted on the four brackets 140. A cylindrical member 160 is attached to a center part of the frame 150. A lower part of the cylindrical member 160 is formed from a flexible synthetic resin and torn into a slit curtain. Articles such as cut vegetables supplied into the cylindrical member 160 from above are retained within the cylindrical member 160 and then are sequentially discharged from its slit-curtain-like lower end part substantially evenly along the tilted surface of the distributing part 110.

The distributing supply unit 100 is installed on the main body 210 of the combination weighing unit 200. The main body 210 is supported by a main body base part 330 through four support legs 220. The main body base part 330 is a casing in a waterproof structure formed into a rectangular ring with a vertically penetrated center portion. An annular frame 340 is attached to the upper face of the main body base part 330 through a plurality of posts 350. The frame 340 supports the plurality of discrete chutes 310. The collection chute 320 comprising the two stages on the upper and lower sides is attached to the main body base part 330 through brackets which are not depicted.

For monitoring how the articles pile up on the distributing part 110, a camera 400 is attached through a pole 410 to an appropriate location beside the distributing supply unit 100. Images captured by the camera 400 are displayed on operation panels, portable terminals, and the like which are not depicted. While observing the images, operators can appropriately adjust the strength and time of vibration of a distributing table 10, the speed and direction of rotation of a rotary stirrer (rotary stirring unit) 30, and the like which will be explained later. The pole 410 is secured onto the main body base part 330.

Figure 2:
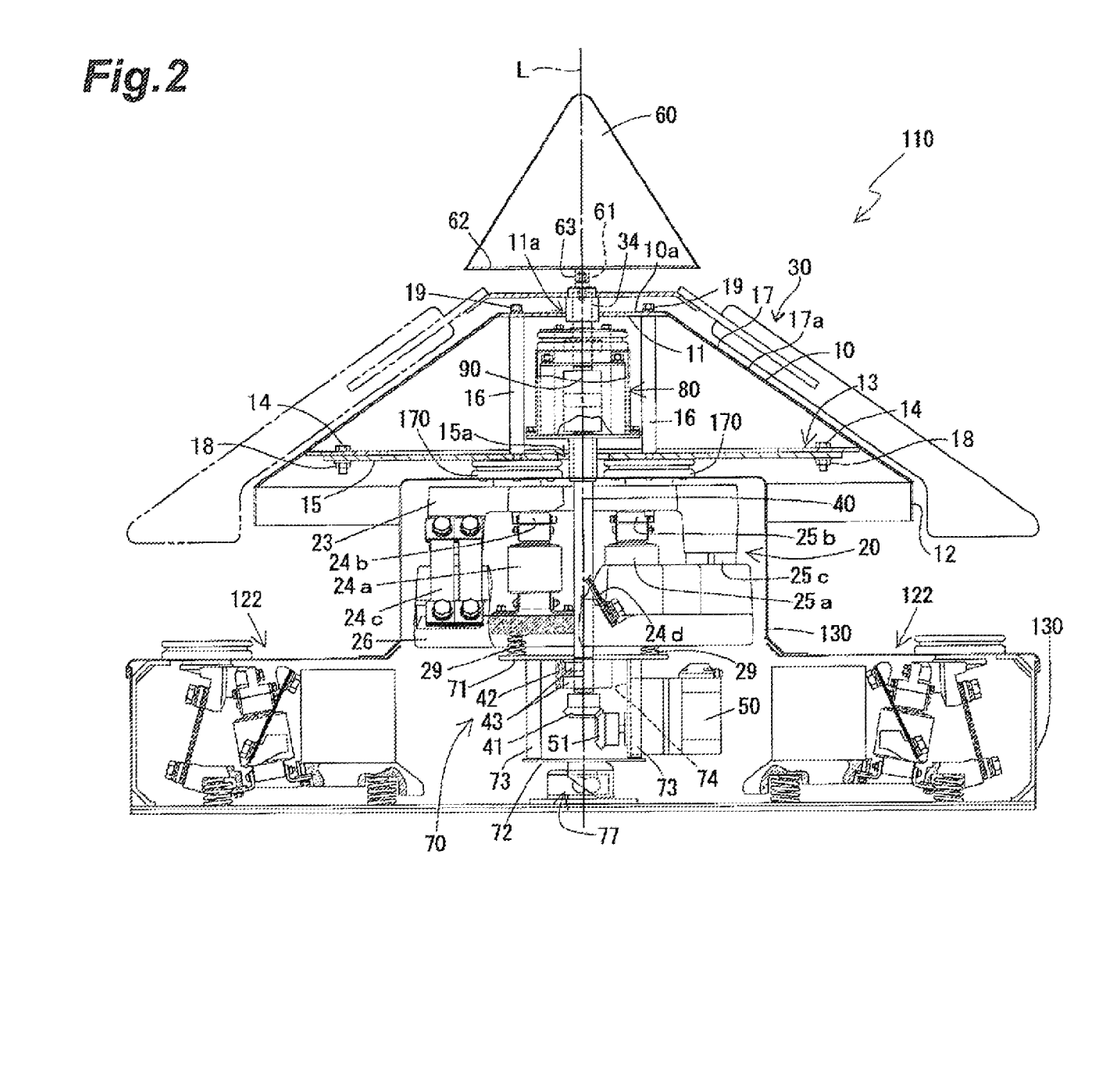
FIG. 2 is a sectional view illustrating an inner structure of a distributing part of the combination weighing apparatus.

FIG. 2 is a sectional view illustrating an inner structure of the distributing part 110. As illustrated in this drawing, the distributing part 110 comprises the conical distributing table 10, the electromagnetic feeder 20, the rotary stirrer 30, the rotary shaft 40, the drive motor 50, and a conical cap (conical body) 60. The electromagnetic feeder 20 imparts vibration to the distributing table 10. The rotary stirrer 30 is disposed like octopus tentacles over the distributing table 10 while keeping a predetermined distance from the distributing table 10. The rotary shaft 40 rotates the rotary stirrer 30 around the vertical axis L. The drive motor 50 drives the rotary shaft 40 to rotate. The cap 60, which is attached to an upper end part of the rotary shaft 40, is disposed above an apex portion 10a of the distributing table 10. As illustrated in FIG. 1, the plurality of supply troughs 121 are arranged radially around the distributing table 10 with a downward gap S interposed therebetween.

As illustrated in FIG. 2, the distributing table 10 has a main body plate 17 formed into a cone by bending a stainless sheet, for example. The outer surface of the main body plate 17 constitutes a conical vibrating surface 17a to which the electromagnetic feeder 20 imparts vibration. By "conical" is meant to encompass both conical and truncated conical forms. In this embodiment, the cap 60 is formed into a cone, while the distributing table 10 and vibrating surface 17a are formed into a truncated cone. The apex portion 10a of the distributing table 10 is a vertex part of a cone when the distributing table 10 is formed into the cone. The apex portion 10a of the distributing table 10 is an upper face of a truncated cone (a surface opposing the bottom face of the truncated cone) when the distributing table 10 is formed into the truncated cone.

A doughnut-shaped plate 11 for inserting the rotary shaft 40 therethrough is welded to an upper end part of the main body plate 17. A short cylinder 12 is welded to a lower end part of the main body plate 17 all over its circumference. A doughnut-shaped first plate 13 is welded to the whole inner circumference of a lower part of the main body plate 17. Bolts 14 are welded downward to a plurality of locations of the first plate 13 at equal intervals. A diameter of a through hole 11a formed in the plate 11 is slightly larger than that of a boss 34 secured to the leading end of the rotary shaft 40. This keeps the plate 11 from coming into contact with the boss 34 even when the distributing table 10 vibrates.

Tapped holes 22 are formed in respective center portions of two movable end parts 21 of the electromagnetic feeder 20 which will be explained later (see FIG. 3). A disk-shaped second plate 15 slightly smaller than the first plate 13 is arranged on the movable end parts 21. Two posts 16, each having a bolt formed in a lower end part, are screwed into the respective tapped holes 22 of the two movable end parts 21 (see FIG. 3) so as to secure the second plate 15 onto the movable end parts 21. The second plate 15 is also formed with a through hole 15a for inserting the rotary shaft 40 therethrough. The diameter of the through hole 15a is also made larger than that of the rotary shaft 40.

In a preliminary step for securing the distributing table 10 to the electromagnetic feeder 20, the two posts 16, the second plate 15 secured to the electromagnetic feeder 20 by the two posts 16, and a chamber 80 which will be explained later are in an exposed state on the upper side of the upper waterproof cover 130. Therefore, the distributing table 10 is mounted thereon, and a leading end part of the rotary shaft 40 is inserted through the through hole 11a formed in the plate 11 at the upper end part. Subsequently, the downward bolts 14 of the first plate 13 of the distributing table 10 are inserted into clearance holes in a peripheral edge portion of the second plate 15 joined to the electromagnetic feeder 20. Then, nuts 18 are screwed onto the bolts 14 projecting out of the second plate 15, so as to secure the first plate 13 of the distributing table 10 to the second plate 15 fixed to the electromagnetic feeder 20.

An upper end part of each post 16 is formed by such a length as to come into contact with the plate 11 in the upper end part of the distributing table 10. The upper end part of each post 16 has a tapped hole. Therefore, bolts 19 are screwed into such tapped holes with the clearance holes of the plate 11 being superposed thereon, so as to secure the plate 11 in the upper end part of the distributing table 10 to the posts 16. Thus, the plate 11 in the upper end parts of the distributing table 10 and the first plate 13 in the lower parts of the distributing table 10 are secured to each of the movable end parts 21 of the electromagnetic feeder 20.

Figure 3:
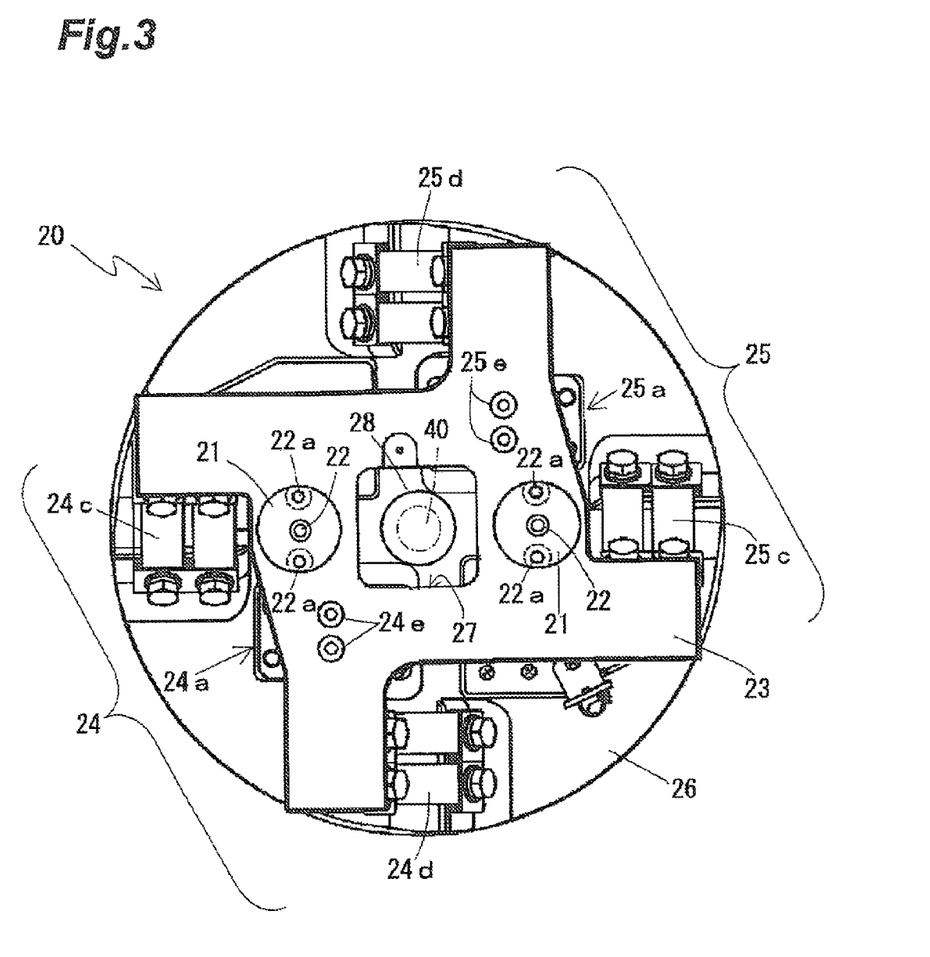
FIG. 3 is a plan view of an electromagnetic feeder.

FIG. 3 is a plan view of the electromagnetic feeder 20. As illustrated in this drawing, the electromagnetic feeder 20 is constructed so as to surround the rotary shaft 40 penetrating through the center part. The electromagnetic feeder 20 comprises a first electromagnetic feeder (vibration source) 24 located on one side of the rotary shaft 40 and a second electromagnetic feeder (vibration source) 25 located on the other side of the rotary shaft 40. In the electromagnetic feeder 20, a base part 26 and a movable part 23 are integrated with each other, so that the movable part 23 as a whole vibrates as a single electromagnetic feeder 20.

More specifically, as illustrated in FIGS. 2 and 3, the first electromagnetic feeder 24 comprises an electromagnet 24a, a movable core 24b, and plate springs 24c, 24d. The second electromagnetic feeder 25 comprises an electromagnet 25a, a movable core 25b, and plate springs 25c, 25d. The electromagnets 24a, 25a are secured to the base part 26. The movable cores 24b, 25b are secured to the movable part 23. The plate springs 24c, 24d are arranged in such directions as to intersect each other while opposing each other across the electromagnet 24a. The plate springs 25c, 25d are arranged in such directions as to intersect each other while opposing each other across the electromagnet 25a. The plate springs 24c, 24d, 25c, 25d are located on respective sides of a quadrangle and mounted while being tilted in such a direction as to make a circuit of the sides. When pulsed waves are fed to the electromagnets 24a, 25a, the two movable cores 24b, 25b attached to the bottom face of the movable part 23 are attracted to the electromagnets 24a, 25a and pulled back by the plate springs 24c, 24d, 25c, 25d. This helically vibrates the movable part 23 as a whole in vertical and circumferential directions. That is, the first and second electromagnetic feeders 24, 25 impart different kinds of vibration to the distributing table 10. The pulsed waves fed to the electromagnets 24a, 25a are currents controlled such as to have the same phase.

A rectangular through hole 27 larger than the diameter of the rotary shaft 40 is formed in a center portion of the movable part 23. The rotary shaft 40 is inserted through the through hole 27 so as not to come into contact with the movable part 23. The two movable end parts 21 are secured onto the movable part 23 so as to be positioned on both sides of the through hole 27. The parts referred to with signs 24e, 25e in FIG. 3 are heads of hexagon socket head bolts for securing the movable cores 24b, 25b to the bottom face of the movable part 23.

A circular through hole 28 having a diameter larger than that of the rotary shaft 40 is formed in a center portion of the base part 26. The rotary shaft 40 is inserted through the through hole 28 so as not to come into contact with the base part 26. Four coil springs 29 are attached to a lower portion of the base part 26. These coil springs 29 attach the electromagnetic feeder 20 as a whole onto an upper plate 71 of a support frame 70. The support frame 70 is constituted by upper and lower plates 71, 72 and four posts 73 joining the upper and lower plates 71, 72 to each other and supports the rotary shaft 40 and drive motor 50. The drive motor 50 is attached to a bracket 74 formed by bending a part of the upper plate 71.

Figure 4:
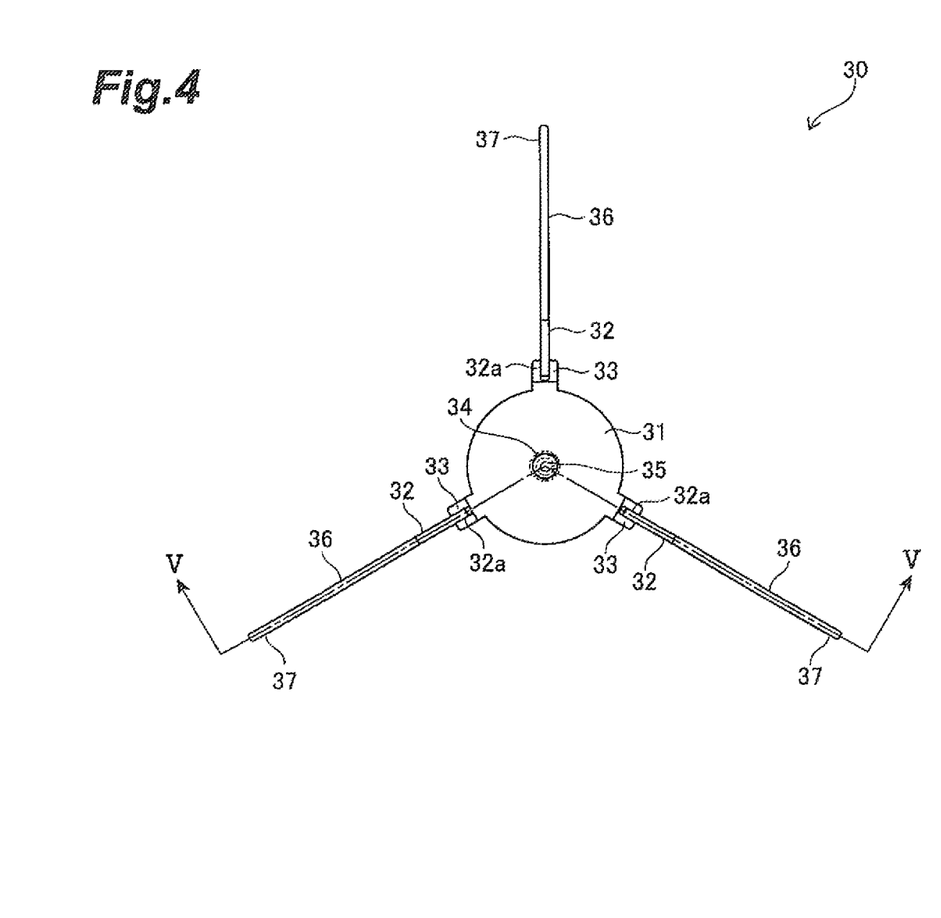
FIG. 4 is a plan view of a rotary stirrer.
Figure 5:
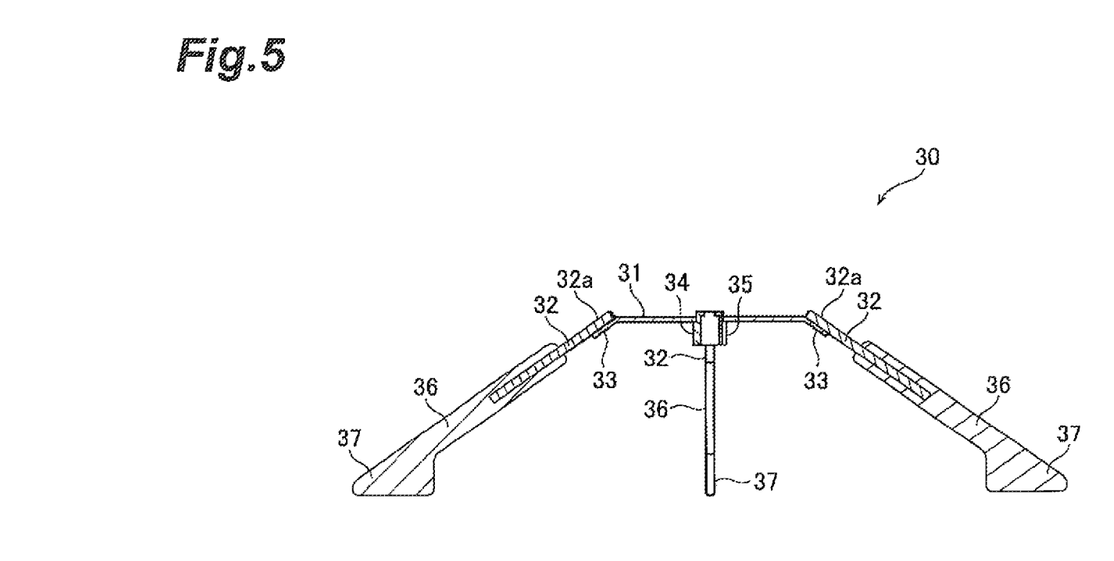
FIG. 5 is a sectional view taken along the line V-V of FIG. 4.

FIG. 4 is a plan view of the rotary stirrer 30, while FIG. 5 is a sectional view taken along the line V-V of FIG. 4. As illustrated in these drawings, the rotary stirrer 30 has a disk 31, three stirring arms 32, the same number of middle stirring plates 36 as the stirring arms 32, and the same number of leading end stirring plates 37 as the middle stirring plates 36. The disk 31 is formed like a doughnut. The same number of extensions 33 as the stirring arms 32 are formed at equally-spaced intervals in a peripheral edge portion of the disk 31. Each extension 33 is formed so as to tilt down to the outside. Each stirring arm 32 has a base end part 32a secured to its corresponding extension 33 by welding, for example. The boss 34 is welded to a center part of the disk 31. The leading end part of the rotary shaft 40 fits into the boss 34. From thereabove, a double-end stud 61 (see FIG. 7) is screwed into a tapped hole formed in the leading end part of the rotary shaft 40, whereby the boss 34 is secured to the leading end part of the rotary shaft 40.

Figure 6:
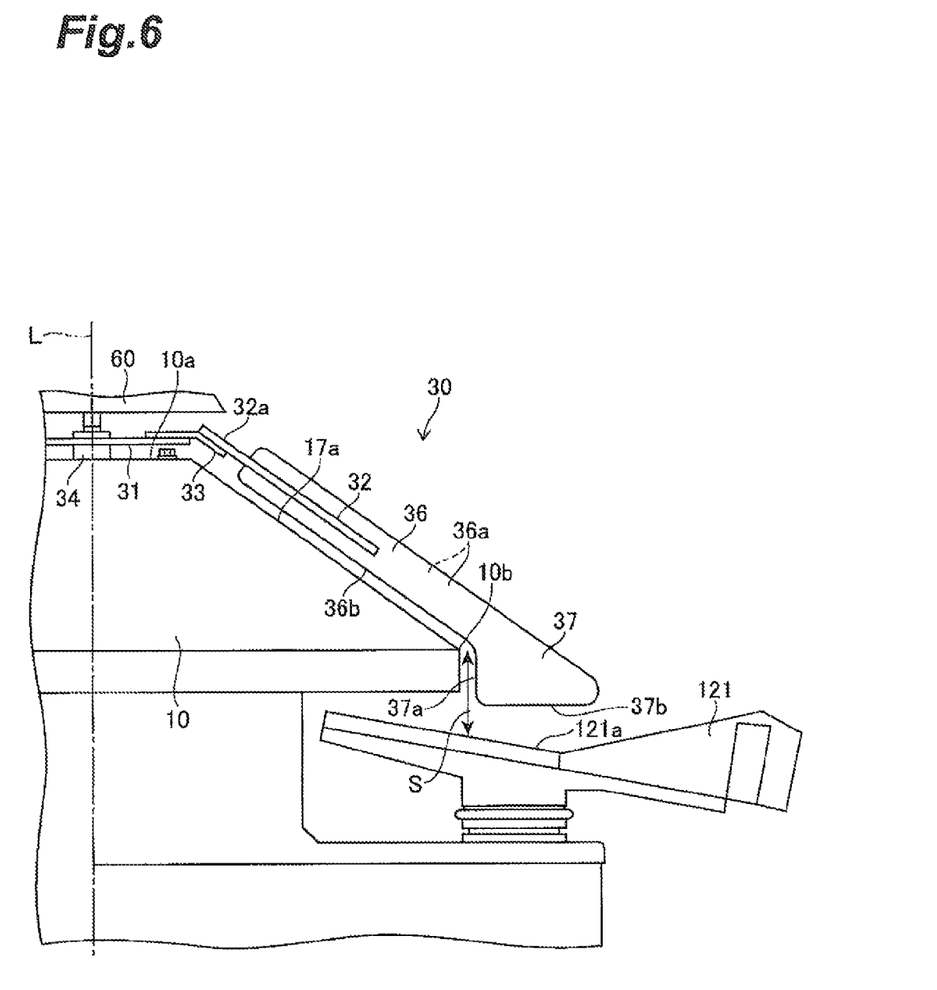
FIG. 6 is an enlarged view of a part including the rotary stirrer in FIG. 1.

FIG. 6 is an enlarged view of a part including the rotary stirrer 30. As illustrated in this drawing, the stirring arms 32 extend from the apex portion 10a of the distributing table 10 along the vibrating surface 17a of the distributing table 10. The middle stirring plates 36 are provided in the stirring arms 32. More specifically, the middle stirring plates 36 are secured to the stirring arms 32 by welding, for example, such that their principal surfaces 36a on both sides are perpendicular to the vibrating surface 17a (i.e., perpendicular to the bottom face of the conical vibrating surface 17a). Edge parts 36b on the vibrating surface 17a side of the middle stirring plates 36 extend along the vibrating surface 17a. A predetermined space is provided between the vibrating surface 17a of the distributing table 10 and the edge part 36b of each middle stirring plate 36 so that the distributing table 10 does not come into contact with the middle stirring plates 36 even when vibrated.

The leading end stirring plates 37 are disposed on the leading end side (the side opposite from the base end parts 32a) of the stirring arms 32. The leading end stirring plates 37 are formed integrally with their corresponding middle stirring plates 36. That is, the middle stirring plates 36 and leading end stirring plates 37 are constituted by the same plate material. The leading end stirring plates 37 are arranged in the gap S formed between a peripheral edge portion 10b of the distributing table 10 and a middle part (a part) 121a of the supply troughs 121. Each leading end stirring plate 37 has such a form (e.g., a triangular plate form) as to extend along the gap S and the middle part 121a of the supply troughs 121. That is, inner and outer edge parts 37a, 37b of the leading end stirring plate 37 extend along the gap S and the middle part 121a of the supply troughs 121, respectively. A predetermined space is provided between the gap surface of the distributing table 10 and the edge part 37a of each leading end stirring plate 37 so that the distributing table 10 does not come into contact with the leading end stirring plates 37 even when vibrated. A predetermined space is provided between the upper face of the middle part 121a of the supply troughs 121 and the edge parts 37b of the leading end stirring plates 37 so that the middle part 121a of the supply troughs 121 does not come into contact with the leading end stirring plates 37 even when the supply troughs 121 are vibrated.

As illustrated in FIG. 1, the rotary stirrer 30 constructed as in the foregoing is rotated normally and reversely around the vertical axis L by the drive motor 50. This enables the rotary stirrer 30 to stir the articles such as cut vegetables supplied from the distributing table 10 to the plurality of supply troughs 121.

As illustrated in FIG. 2, the conical cap 60 is attached to the upper part of the double-end stud 61. The bottom face of the cap 60 is closed with a disk 62, while a nut 63 is welded to a center part of the disk 62. The upper bolt of the double-end stud 61 is screwed into the nut 63, whereby the cap 60 is secured to the leading end part of the rotary shaft 40. This enables the cap 60 to rotate together with the rotary stirrer 30 around the vertical axis L passing through the vertex of the cap 60. As illustrated in FIGS. 4 and 5, a key groove 35 is formed in the inner periphery of the boss 34. The boss 34 is joined to the rotary shaft 40 when a key is inserted into the key groove 35.

As illustrated in FIG. 2, the rotary shaft 40 has such a length as to extend from the lower part of the cap 60 to below the electromagnetic feeder 20. A bevel gear 41 is attached to a lower end part of the rotary shaft 40. Another bevel gear 51 for transmitting power to the former bevel gear 41 is attached to a drive shaft of the drive motor 50. A housing 42 is secured to the lower face of the upper plate 71 of the support frame 70. Upper and lower bearings 43 for supporting the rotary shaft 40 are contained in the housing 42. An undepicted C-ring is mounted at the boundary between the bearings 43 and the rotary shaft 40, so as to prevent the rotary shaft 40 from dropping down.

Figure 7:
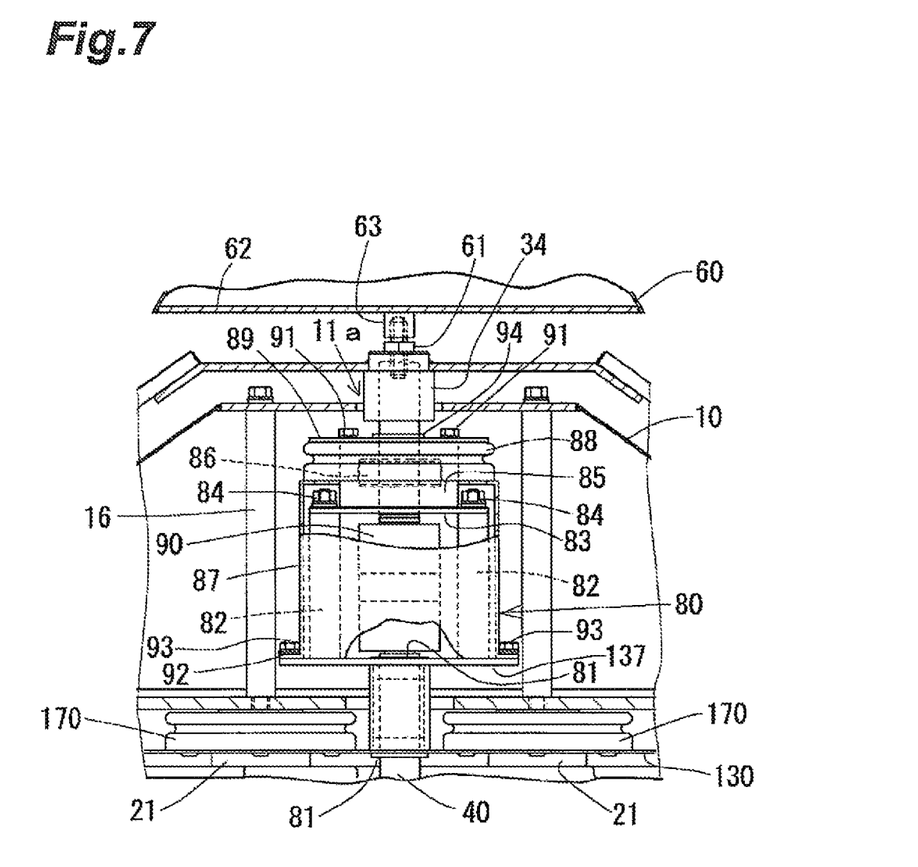
FIG. 7 is an enlarged sectional view illustrating the structure of a chamber contained in a distributing table.

FIG. 7 is an enlarged sectional view illustrating the structure of a chamber 80 contained in the distributing table 10. As illustrated in this drawing, the rotary shaft 40 projects out of the upper waterproof cover 130 containing the electromagnetic feeder 20, so as to join with a coupling 90 in the chamber 80 contained in the distributing table 10. The rotary shaft 40 for rotating the rotary stirrer 30 is joined to an upper part of the coupling 90. The coupling 90 is disposed at this position in order to transmit torque to the leading end part of the rotary shaft 40 by absorbing some misalignment, if any, occurring between the axis of the part of rotary shaft 40 contained in the upper waterproof cover 130 and that of the part of rotary shaft 40 contained in the chamber 80.

Figure 8:
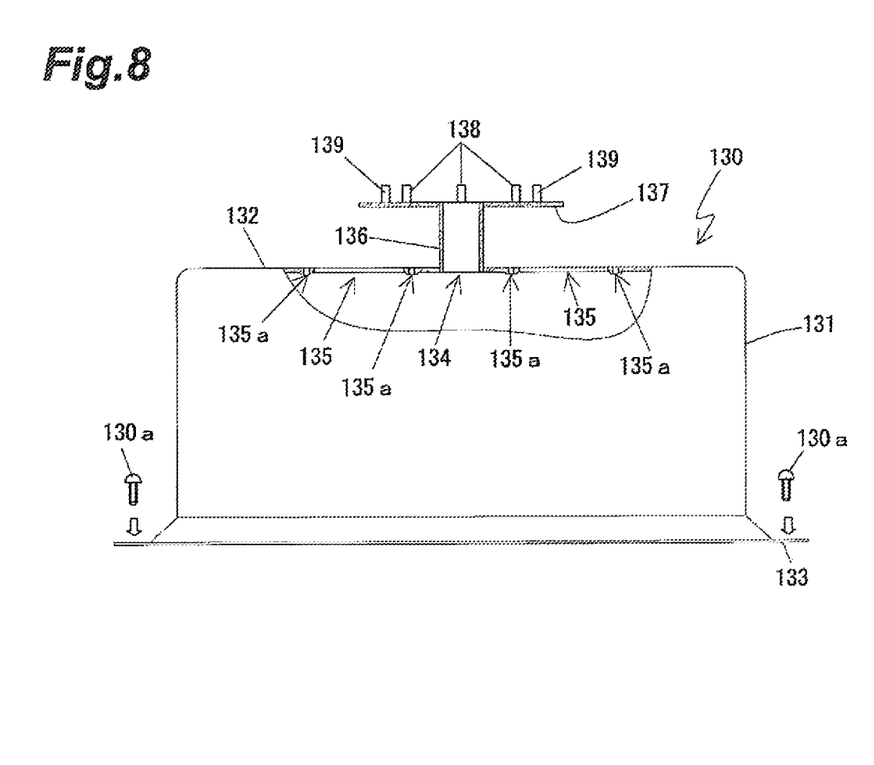
FIG. 8 is a front sectional view of an upper waterproof cover.

FIG. 8 is a partly sectional view of the upper waterproof cover 130 watertightly containing the electromagnetic feeder 20. As illustrated in this drawing, the upper waterproof cover 130 has a cylindrical part 131, a top plate part 132, and a flange 133. The top plate part 132 closes the upper end of the cylindrical part 131. The flange 133 is formed at the lower end of the cylindrical part 131. A through hole 134 is formed at a center portion of the top plate part 132. The through hole 134 allows the rotary shaft 40 to penetrate therethrough. Two through holes 135 are further formed in the top plate part 132 so as to be positioned on both sides of the former through hole 134. The two movable end parts 21 of the electromagnetic feeder 20 are inserted through the two through holes 135, respectively. Welded to the center through hole 134 is a cylinder 136 having the same diameter. The cylinder 136 allows the rotary shaft 40 to penetrate therethrough. A doughnut-shaped disk 137 is attached to the upper end of the cylinder 136. Four inner bolts 138 and four outer bolts 139 are attached upward to a peripheral edge portion of the disk 137. The chamber 80 is attached to the bolts 138, 139. Bushes 81 (see FIG. 7) molded from a resin are fitted between the rotary shaft 40 and upper and lower end parts of the cylinder 136. The rotary shaft 40 is held by the bushes 81.

While inserting the rotary shaft 40 through the cylinder 136, thus constructed waterproof cover 130 is put on the electromagnetic feeder 20 and joined to the lower waterproof cover 130 with bolts 130a. Waterproof bellows 170 (see FIG. 7) for sealing are put on the respective movable end parts 21 of the electromagnetic feeder 20 projecting out of the through holes 135. That is, an undepicted plate for attaching the lower end faces of the waterproof bellows 170 to the top plate part 132 under pressure is screwed to a plurality of tapped holes 135a formed by burring around the through hole 135. This secures the lower ends of the waterproof bellows 170 in close contact with the upper face of the top plate part 132. Another undepicted plate is put on the upper end faces of the waterproof bellows 170 and screwed to tapped holes 22a (see FIG. 3) formed in the movable end parts 21. This enables the waterproof bellows 170 to seal the two through holes 135. The waterproof bellows 170 are formed from flexible synthetic rubber as with a waterproof bellows 88 (see FIG. 7) which will be explained later. This keeps vibration of the two movable end parts 21, if any, from being transmitted to the waterproof covers 130.

As illustrated in FIGS. 7 and 8, posts 82 each having female threaded upper and lower ends are screwed into the respective inner bolts 138 attached to the disk 137 of the waterproof covers 130 so as to be erected vertically. A doughnut-shaped plate 83 having a through hole formed at a center part thereof is put on the four posts 82. The plate 83 is secured to the upper end parts of the four posts 82 with bolts 84. A housing 85 containing a bearing 86 for supporting the rotary shaft 40 is installed on the plate 83. A cover 87 having a through hole in an upper end part thereof is put on the housing 85. The waterproof bellows 88 is put on the housing 85 projecting out of the through hole of the cover 87. The lower end face of the waterproof bellows 88 is secured in close contact with the upper face of the cover 87.

A doughnut-shaped disk 89 is put on the upper end face of the waterproof bellows 88. The upper end face of the waterproof bellows 88, together with the housing 85, is secured to the plate 83 with bolts 91, so as to be sealed. The rotary shaft 40 is inserted through the through hole formed in the center part of the disk 89. An oil seal 94 is provided between the through hole and the rotary shaft 40 so that no water infiltrates the chamber 80 therefrom. A flange 92 is formed at a lower end part of the cover 87. The outer bolts 139 (see FIG. 8) secured onto the disk 137 are fitted into four clearance holes formed in the flange 92 and fastened with nuts 93, so as to fix the cover 87 onto the disk 137.

Thus, while being insulated from the electromagnetic feeder 20, the rotary shaft 40 for rotating the rotary stirrer 30 penetrates through the waterproof covers 130 and chamber 80 joined to each other, so as to project upward from the through hole 11a formed in the plate 11 of the distributing table 10. The rotary stirrer 30 is attached to the leading end part of the projected rotary shaft 40.

Effects

In the combination weighing apparatus 1, the conical cap 60 is disposed above the apex portion 10a of the distributing table 10, whereby cut vegetables and the like can be supplied from above the apex portion 10a of the distributing table 10. The cut vegetables and the like supplied to the distributing table 10 are transferred to all over the periphery of the distributing table 10 while being inhibited from adhering to the distributing table 10 by the conical vibrating surface 17a. Since a plurality of supply troughs 121 are radially arranged around the distributing table 10 with the downward gap S interposed therebetween, the cut vegetables and the like transferred to the periphery of the distributing table 10 are fed to the supply troughs 121 while being restrained from stagnating between the periphery of the distributing table 10 and the supply troughs 121. Since the rotary stirrer 30 includes the leading end stirring plates 37 arranged in the gap S between the periphery of the distributing table 10 and the supply troughs 121, the leading end stirring plates 37 rotate along the periphery of the distributing table 10, thereby securely inhibiting the cut vegetables and the like from stagnating between the periphery of the distributing table 10 and the supply troughs 121. The foregoing enables the combination weighing apparatus 1 to supply cut vegetables and the like, which are articles easy to adhere and hard to be dealt with, all over the supply troughs 121. This also leads to reduction in the number of operators.

In the combination weighing apparatus 1, the leading end stirring plate 37 is shaped along the gap S and the middle part 121a of the supply trough 121. This securely inhibits the cut vegetables and the like from stagnating between the periphery of the distributing table 10 and the supply troughs 121.

In the combination weighing apparatus 1, the stirring arm 32 is provided with the middle stirring plate 36 having the principal surfaces 36a perpendicular to the vibrating surface 17a. This enables the middle stirring plate 36 to rotate along the vibrating surface 17a of the distributing table 10, thereby securely inhibiting the cut vegetables and the like from adhering to the distributing table 10 and being distributed unevenly over the distributing table 10.

In the combination weighing apparatus 1, the leading end stirring plate 37 is formed integrally with the middle stirring plate 36. This more securely inhibits the cut vegetables and the like from adhering to the middle and leading end stirring plates 36, 37 as compared with a case where middle and leading end stirring plates 36, 37 constructed separately from each other are connected to each other with a joint member, for example. It also becomes easier for operators to perform cleaning operations.

The combination weighing apparatus 1 further comprises the first and second electromagnetic feeders 24, 25 for imparting different kinds of vibration to the distributing table 10. This can provide the distributing table 10 with such vibration that the cut vegetables and the like are inhibited from adhering to the distributing table 10 and transferred smoothly to the periphery of the distributing table 10.

The combination weighing apparatus 1 comprises the drive motor 50 for rotating the rotary stirrer 30 normally and reversely. This enables the normally and reversely rotated leading end stirring plate 37 to securely inhibit the cut vegetables and the like from stagnating between the periphery of the distributing table 10 and the supply troughs 121.

In the combination weighing apparatus 1, the rotary stirrer 30 is provided with the three stirring arms 32. This enables the three leading end stirring plates 37 to efficiently and securely inhibit the cut vegetables and the like from stagnating between the periphery of the distributing table 10 and the supply troughs 121.

MODIFICATION EXAMPLES

The gap S may be formed between the peripheral edge portion 10b of the distributing table 10 and a part of the supply troughs 121 other than the middle part 121a thereof. Even in such a case, placing the leading end stirring plates 37 in the gap S securely inhibits cut vegetables and the like from stagnating between the periphery of the distributing table 10 and the supply troughs 121. Shaping the leading end stirring plates 37 along the gap S and a part of the supply troughs 121 in such a case also more securely inhibits the cut vegetables and the like from stagnating between the periphery of the distributing table 10 and the supply troughs 121.

The number of stirring arms 32 is not limited to 3. The number of stirring arms 32 can be set appropriately according to the kind, size, moisture attachment state, and amount of each supply of cut vegetables and the like. The middle stirring plate 36 may be secured to the stirring arm 32 such that its principal surfaces 36a tilt with respect to the vibrating surface 17a.

The combination weighing apparatus 1 may be provided with three or more pairs of electromagnetic feeders which impart different kinds of vibration to the distributing table 10. Integrating the base and movable parts together in each pair of electromagnetic feeders in such a case can also generate vibration having different directional components in the movable parts. A support frame may be provided under each electromagnetic feeder, while a drive motor for driving the rotary shaft may be attached to the support frame. The distributing part as a whole may be loaded on a weight detector through the support frame, and the supply of articles to the distributing part may be controlled according to the detected weight. However, such a weight detector is not necessary, since the rotary stirrer evenly transfers articles over the distributing table. A structure in which a motor shaft and a rotary shaft are directly joined to each other may be employed in a space saved by eliminating the weight detector.

The present invention can provide a combination weighing apparatus suitable for cut vegetables and the like.

What is claimed is:

1. A combination weighing apparatus comprising:
   a distributing table having a conical vibrating surface;
   a conical body disposed above an apex portion of the distributing table;
   a plurality of radial parts arranged radially around the distributing table with a downward gap interposed therebetween; and
   a rotary stirring unit that stirs articles supplied from the distributing table to the plurality of radial parts;
   wherein the rotary stirring unit includes:
   a stirring arm extending from the apex portion of the distributing table along the vibrating surface; and
   a leading end stirring plate disposed on the leading end side of the stirring arm; and
   wherein the leading end stirring plate is arranged in the gap.

2. A combination weighing apparatus according to claim 1, wherein the leading end stirring plate is shaped along the gap and a part of the radial parts.

3. A combination weighing apparatus according to claim 1, wherein the stirring arm is provided with a middle stirring plate having a surface perpendicular to the vibrating surface.

4. A combination weighing apparatus according to claim 3, wherein the leading end stirring plate is formed integrally with the middle stirring plate.

5. A combination weighing apparatus according to claim 1, further comprising a plurality of vibration sources that impart different kinds of vibration to the distributing table.

6. A combination weighing apparatus according to claim 1, further comprising a driving source that rotates the rotary stirring unit normally and reversely.

7. A combination weighing apparatus according to claim 1, wherein three such stirring arms are provided.

* * * * *